United States Patent [19]

Greminger, Jr. et al.

[11] Patent Number: 4,594,108

[45] Date of Patent: Jun. 10, 1986

[54] HIGHLY PSEUDOPLASTIC POLYMER SOLUTIONS

[75] Inventors: George K. Greminger, Jr.; Mary K. Dehnke, both of Midland, Mich.

[73] Assignee: The Dow Chemical Company, Midland, Mich.

[21] Appl. No.: 682,566

[22] Filed: Dec. 14, 1984

Related U.S. Application Data

[63] Continuation of Ser. No. 533,186, Sep. 19, 1983, abandoned.

[51] Int. Cl.$^4$ ............................. C08L 1/08; C08L 1/26
[52] U.S. Cl. ................................. 106/170; 106/197.1; 252/315.3; 524/43; 524/44
[58] Field of Search .................... 257/315.3; 524/2, 5, 524/68, 42, 43; 106/170, 188, 197.1

[56] References Cited

U.S. PATENT DOCUMENTS

| | | | |
|---|---|---|---|
| 3,758,641 | 9/1973 | Zweigle | 252/2 |
| 3,898,165 | 8/1975 | Ely et al. | 252/315.3 |
| 3,899,439 | 8/1975 | Mahlman | 106/197.1 |
| 4,069,082 | 1/1978 | Grosse et al. | 106/187 |
| 4,210,206 | 7/1980 | Ely et al. | 252/315.3 |

OTHER PUBLICATIONS

*Industrial Gums,* Whistler, R. L. 2nd Edition, Academic Press N.Y., 1973, pp. 654 & 655.

*Primary Examiner*—Theodore Morris
*Attorney, Agent, or Firm*—Robert W. Welsh

[57] ABSTRACT

Thickening compositions are disclosed which impart highly pseudoplastic behavior to aqueous compositions containing same. The compositions of this invention comprise a water-soluble high molecular weight organic polymer and a water-insoluble, water-dispersible and water-swellable organic polymer which is compatible with the water-soluble polymer. Aqueous solutions, suspensions or emulsions containing the thickeners of this invention exhibit very high sensitivity to applied shear.

10 Claims, No Drawings

HIGHLY PSEUDOPLASTIC POLYMER SOLUTIONS

CROSS-REFERENCE TO RELATED APPLICATION

This is a continuation of application Ser. No. 533,186 filed Sept. 19, 1983 now abandoned.

BACKGROUND OF THE INVENTION

This invention relates to polymeric thickeners which impart highly pseudoplastic behavior to compositions containing same.

Pseudoplastic compositions are compositions whose viscosity varies in accordance to the shear which is applied to said compositions. In many instances, pseudoplasticity is a desirable attribute of a composition. In many emulsion systems, it is desirable for the emulsion to have a high viscosity upon standing in order to best maintain the stability of the emulsion, but to exhibit a substantially lower viscosity when used in order to facilitate such use. For example, many latex paints are formulated to be very viscous on standing in order to maintain a homogeneous dispersion of its components. However, the shear applied to the paint upon spreading or brushing causes the viscosity of said paints to dramatically drop, thereby easing the application of the paint to the substrate. Then, upon removing the shearing force of the spreader, the paint regains its highly viscous nature and does not flow off the surface to which it is applied. Certain food substances, such as mayonnaises, exhibit similar behavior. Emulsions such as salad dressings and mayonnaise are often quite thick and viscous when in their containers; but are easily spread when subjected to the shearing action such as is applied with a knife.

In such systems, it is often desirable to increase the pseudoplasticity of the composition, i.e., to increase the dependence of the composition's viscosity to the shear being applied thereto. Unfortunately, however, most polymeric thickeners do not impart the desired degree of pseudoplastic behavior to the composition. Accordingly, a thickener which does impart very high pseudoplasticity to compositions containing said thickener would be highly desirable.

SUMMARY OF THE INVENTION

This invention is such a thickener. The thickener of this invention comprises (a) a water-soluble, high molecular weight organic synthetic or modified natural polymer and (b) a water-insoluble, water-swellable organic synthetic or modified natural polymer which is compatible with the water-soluble polymer. The proportions of the water-soluble and water-insoluble polymers are chosen such that compositions containing said thickener exhibit more highly pseudoplastic behavior than compositions containing the water-insoluble or water-soluble polymer alone.

In another aspect, this invention is a process for controlling the pseudoplastic behavior of an aqueous composition comprising adding to said composition (a) a water-soluble, high molecular weight organic polymer and (b) a water-insoluble, water-swellable organic polymer, the proportions of the water-soluble and water-insoluble polymers being chosen together such that the composition exhibits the desired pseudoplastic behavior.

DETAILED DESCRIPTION OF THE INVENTION

The composition in which the thickener of this invention is employed in any aqueous composition in which highly pseudoplastic behavior is desired. Preferably, however, the composition is an aqueous emulsion comprising a continuous aqueous phase having dispersed therein a discontinuous organic phase, i.e., an oil-in-water emulsion. In such emulsion systems, such pseudoplastic behavior is often highly desirable due to the need to maintain the stability of the emulsion for extended periods during storage and also to have a system which has low viscosity upon use. Also of interest herein are suspensions such are used in diverse agricultural formulations, pigment suspensions and the like wherein a continuous aqueous phase has contained therein suspended particles of water-insoluble material.

The thickener of this invention comprises two components. The first component is a water-soluble, high molecular weight organic synthetic or modified natural polymer. The molecular weight of this water-soluble polymer is sufficiently high to impart the desired viscosity to the composition containing this thickener. Advantageously, the water-soluble polymer has a molecular weight sufficiently high such that an aqueous solution containing 2 weight percent of this polymer will exhibit a viscosity of at least 5,000, preferably at least 20,000, more preferably at least 50,000, most preferably at least 75,000, centipoises. A variety of polymeric materials may be used as a water-soluble polymer herein including cellulose ethers such as methylcellulose, hydroxypropylmethylcellulose, carboxymethylcellulose, hydroxyethylmethylcellulose, hydroxypropylcellulose, hydroxyethylcellulose, and the like, polyacrylamides, sulfonated polystyrenes, copolymers of acrylic acid, hydroxypropylated guar and the like. The choice of the particular water-soluble polymer depends primarily on the compatibility of such polymer with the other components of the composition to contain the thickener and the ultimate end use of the composition. For example, it is generally desirable that the water-soluble polymer does not react, complex or otherwise significantly interact with the other components of the composition to contain the thickener. Preferably, the water-soluble polymer is a water-soluble cellulose ether and more preferably is methylcellulose or hydroxypropylmethylcellulose.

The second component of the thickener of this invention is a water-insoluble but water-swellable and water-dispersible organic synthetic or modified natural polymer. Again, a wide variety of polymers are suitable as the water-insoluble component of the thickener of this invention. The water insolubility of these polymers may be due to crosslinks, high molecular weight or the presence of hydrophobic groups on the polymer. For example, diverse cellulose ethers which have substituents of such type and amount such that the polymer is water-swellable but not water-soluble may be used herein. For example, methylcellulose having relatively low amounts of methoxy substitution (i.e., less than about 18 percent methoxyl) are suitably used herein. Other cellulose derivatives which may be used as the water-insoluble component include ethylcellulose, ethylhydroxypropylmethylcellulose, and the like. Lightly crosslinked polyacrylamides may also be employed herein, as well as lightly crosslinked sulfonated polystyrene. Addition copolymers containing a quantity of repeating units derived from hydrophobic monomers such as acrylamide or acrylic acid may be employed herein if the content of such hydrophobic monomers is such that the polymer has the requisite water insolubility and water swellability. As with the water-soluble polymer, the water-insoluble polymer is chosen so that the thickener does not undesirably interact with the other components of the composition to be thickened. In addition, the water-insoluble polymer must be compatible with the water-soluble polymer. Typically, it is preferred to employ a water-insoluble polymer of the general type as the water-soluble polymer. For example, water-insoluble cellulose ethers are most advantageously employed with water-soluble cellulose ethers.

The relative amounts of the water-insoluble and water-soluble components are chosen such that the resulting thickener will impart the desired viscosity and pseudoplasticity to compositions in which they are contained. Generally, the majority component of this thickener is the water-insoluble component. Preferably, the water-insoluble component comprises from about 50 to about 90, more preferably about 65 to about 80, weight percent of the combined weight of water-insoluble and water-soluble components.

Sufficient of the thickener of this invention is employed in the composition to be thickened to impart the desired rheological properties thereto (i.e., the desired viscosity and pseudoplastic behavior). Generally, the thickener of this invention is employed in an amount from about 0.05 to about 20, preferably about 0.1 to about 10, more preferably from about 0.3 to about 5, weight percent of the composition.

This invention also provides a process for providing control of the rheology of aqueous solutions and emulsions. This process comprises adding to said solution or emulsion an amount of a water-insoluble polymer and a water-soluble polymer as described hereinbefore such that the desired rheological properties are imparted to the emulsion or solution. This process may be used to adjust the rheology of an aqueous composition at the time of its preparation or, alternatively, at the time such composition is to be used. The advantage of this process is that quite substantial increases in the pseudoplastic behavior of an aqueous solution or emulsion can be effected by the addition of relatively small amounts of the thickener of this invention. In addition, such adjustments to the pseudoplasticity can be made controllably and repeatedly according to this invention.

The thickeners of this invention may be employed in many aqueous solutions, suspensions or emulsions provided that such suspensions and emulsions have a continuous aqueous phase. In particular, the thickeners of this invention may be employed in agricultural formulations, pigment suspensions, textile printing pastes, latex paints, food emulsions and pharmaceutical emulsions.

The following example is intended to illustrate the invention but not to limit the scope thereof. All parts and percentages are by weight unless otherwise indicated.

EXAMPLE 1

Aqueous solutions containing a water-soluble cellulose ether and a water-insoluble ether are prepared and designated Sample Nos. 1–7. Sample No. 8 contains a water-soluble component only, and is presented for comparison only. The compositions of Sample Nos. 1–8 are as indicated in Table I following.

TABLE I

| Sample No. | Soluble Component % | | Insoluble Componenet % | | |
|---|---|---|---|---|---|
| | MPMC[1] | SMC[2] | IMC[3] | EHPMC-1[4] | EHPMC-2[5] |
| 1 | 2 | — | 1 | — | — |
| 2 | — | 2 | 4 | — | — |
| 3 | — | 1 | 2 | — | — |
| 4 | — | 0.6 | — | 2.4 | — |
| 5 | — | 0.6 | — | — | 2.4 |
| 6 | — | 1.2 | — | 4.8 | — |
| 7 | — | 1.2 | — | — | 4.8 |
| 8 | 2 | — | — | — | — |

[1]Hydroxypropylmethylcellulose, 2 percent solution viscosity, 75,000 cps. Percent hydroxypropyl is 23–32. Percent methoxyl is 16.5–20.
[2]Soluble methylcellulose; water-soluble methylcellulose, 27.5–31.5 percent methoxyl content, viscosity of 2 percent aqueous solution is 500,000 cps.
[3]Insoluble methylcellulose; water-insoluble methylcellulose, methoxy content ~18 percent, viscosity of 2 percent aqueous solution is 25–400 cps.
[4]Ethyl hydroxypropylmethylcellulose, 13.3 percent ethoxyl, 7.5 percent hydroxypropoxyl and 17.5 percent methoxyl.
[5]Ethylhydroxypropylmethylcellulose, 10.7 percent ethoxyl, 5.6 percent hydroxypropoxyl, 26.2 percent methoxyl.

The rheological properties of Sample Nos. 3, 4 and 5 and Comparative Sample No. 8 are evaluated with a Haake RV3 instrument using the MV St. cup and MV I bob. All evaluations are performed at 20° C. An initial shear rate is applied on the sample, providing a plateau or constant shear stress with time. In a step-wise procedure, the shear rate is increased to determine the shear stress of that particular shear rate. From the shear stress, the viscosity of the sample is calculated according to the equation:

$$N = \frac{G \cdot S}{n}$$

wherein N is viscosity (or centipoises), G is a constant for the Haake RV3 instrument, S is the shear stress as read from the instrument graph, and n is the shear rate, expressed in rpm of the instrument. From the instrument rpm is calculated true shear rate. The results of the evaluation of Sample Nos. 3, 4, 5 and Comparative Sample No. 8 are as reported in Table II following.

TABLE II

| Shear Rate (sec$^{-1}$) | VISCOSITY (in Thousand cps) Sample No. | | | |
|---|---|---|---|---|
| | 3 | 4 | 5 | 6 |
| ~0.1 | 200 | 16 | 35 | 200 |
| 1 | 100 | 10 | 22 | 175 |
| 3 | 40 | 6.5 | 14 | 130 |
| 5 | 28 | 5 | 11 | 105 |
| 10 | 20 | 3 | 8 | 80 |
| 15 | 15 | 2.8 | 7 | 65 |
| 20 | 9 | 2.5 | 5.5 | 55 |
| 30 | — | 2 | 4.5 | 40 |
| 40 | — | 1.8 | 4 | 33 |
| 50 | — | 1.5 | 3.5 | 30 |
| 100 | — | 0.8 | 2 | 18 |

*Not an example of the invention.

As can be seen from the data in Table II, the samples containing the thickener of this invention exhibit more highly pseudoplastic behavior (i.e., variations in viscosity in response to shear rate) than the control sample. For example, the viscosity of Sample Nos. 3, 4 and 5 drops by 91, 84 and 84 percent, respectively, when subjected to a shear rate of 20 sec$^{-1}$. By contrast, the viscosity drop in the control is only 72 percent. The increased sensitivity to very small shear rates is particularly increased in the samples of the invention. At a shear rate of 3 sec$^{-1}$, Sample Nos. 3, 4 and 5 exhibit viscosity drops of 60, 59 and 69 percent, respectively, as compared to a drop of only 35 percent in the control.

In a similar manner, Sample Nos. 1, 2, 6 and 7 are evaluated for pseudoplastic behavior. All are found to exhibit increased pseudoplasticity as compared to the control.

What is claimed is:

1. An aqueous suspension comprising a continuous aqueous phase containing suspended particles of water-insoluble material; wherein the suspension contains a thickener comprising (a) a water-soluble organic synthetic or modified natural polymer which has a viscosity of at least 5,000 centipoises measured as a 2 weight percent aqueous solution and (b) a water-insoluble, water-dispersible and water-swellable organic synthetic or modified natural polymer which is compatible with said water-soluble polymer, said water-insoluble polymer being present in an amount sufficient to increase the pseudoplastic behavior of an aqueous medium containing said composition relative to the pseudoplastic behavior of an aqueous medium containing the water-soluble polymer or said water-insoluble polymer alone.

2. An aqueous emulsion comprising a continuous aqueous phase having dispersed therein a discontinuous organic phase which contains a thickener comprising (a) a water-soluble organic synthetic or modified natural polymer having a viscosity of at least 5,000 centipoises measured as a 2 weight percent aqueous solution and (b) a water-insoluble, water-dispersible and water-swellable organic synthetic or modified natural polymer which is compatible with said water-soluble polymer, said water-insoluble polymer being present in an amount sufficient to increase the pseudoplastic behavior of an aqueous medium containing said composition relative to the pseudoplastic behavior of an aqueous medium containing the water-soluble polymer or said water-insoluble polymer alone.

3. A process for increasing the pseudoplastic behavior of an aqueous emulsion, suspension comprising adding to said aqueous emulsion, suspension or solution a functionally effective amount of a thickener comprising (a) a water-soluble organic synthetic or modified natural polymer having a viscosity of at least 5,000 centipoises measured as a two percent aqueous solution and (b) a water-insoluble, water-dispersible, and water-swellable organic synthetic or modified natural polymer which is compatible with said water-soluble polymer; said water-insoluble polymer being present in an amount sufficient to increase the pseudoplastic behavior of an aqueous medium containing said composition relative to the pseudoplastic behavior of an aqueous medium containing the water-soluble polymer or said water-insoluble polymer alone.

4. The process of claim 3 wherein the water-insoluble polymer comprises from about 50 to about 90 weight percent of the combined weight of the water-soluble and water-insoluble polymer.

5. The process of claim 4 wherein the water-soluble polymer is a cellulose ether which exhibits a viscosity of at least about 20,000 centipoises as a two percent aqueous solution at 20° C.

6. The process of claim 5 wherein the water-insoluble polymer is a water-insoluble cellulose ether.

7. The process of claim 6 wherein the water-soluble cellulose ether is hydroxylpropyl methylcellulose or methylcellulose.

8. The process of claim 7 wherein the water-insoluble cellulose ether is a water-insoluble methylcellulose or a water-insoluble ethylhydroxypropyl methylcellulose.

9. The process of claim 4 wherein the water-soluble polymer is a water-soluble polyacrylamide and the water-insoluble polymer is a polyacrylamide which is crosslinked in an amount sufficient to render it insoluble in water.

10. The process of claim 4 wherein the water-insoluble polymer is a crosslinked polymer.

* * * * *